US012628165B2

(12) United States Patent
Li et al.

(10) Patent No.: US 12,628,165 B2
(45) Date of Patent: May 12, 2026

(54) COMMUNICATION METHOD AND COMMUNICATION APPARATUS

(71) Applicant: HUAWEI TECHNOLOGIES CO., LTD., Shenzhen (CN)

(72) Inventors: Yunbo Li, Shenzhen (CN); Jian Yu, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 439 days.

(21) Appl. No.: 17/973,745

(22) Filed: Oct. 26, 2022

(65) Prior Publication Data

US 2023/0064880 A1 Mar. 2, 2023

Related U.S. Application Data

(63) Continuation of application No. PCT/CN2021/088998, filed on Apr. 22, 2021.

(30) Foreign Application Priority Data

Apr. 27, 2020 (CN) ........................ 202010346204.6

(51) Int. Cl.
*H04W 72/20* (2023.01)

(52) U.S. Cl.
CPC .................................. *H04W 72/20* (2023.01)

(58) Field of Classification Search
CPC ..... H04W 72/20; H04W 72/40; H04W 28/20; H04W 72/0453; H04W 72/21; H04W 72/23; H04W 72/535; H04W 72/53
See application file for complete search history.

(56) References Cited

U.S. PATENT DOCUMENTS

2019/0215884 A1* 7/2019 Patil .................... H04W 74/004
2020/0015219 A1* 1/2020 Asterjadhi ............ H04W 72/51
(Continued)

FOREIGN PATENT DOCUMENTS

CN 107710820 A 2/2018
CN 108064084 A 5/2018
(Continued)

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.
(Continued)

*Primary Examiner* — Joseph E Avellino
*Assistant Examiner* — Adam Joel Cerlanek
(74) *Attorney, Agent, or Firm* — HAUPTMAN HAM, LLP

(57) ABSTRACT

A communication method includes generating, by a first device, first control information, and sending, by the first device, the first control information to a second device. The first control information includes a first field and a second field. The first field is useable to indicate a channel state of a first subchannel in a first channel segment. The second field is useable to indicate a channel state of a second subchannel in a second channel segment.

15 Claims, 6 Drawing Sheets

(56) References Cited

U.S. PATENT DOCUMENTS

| | | | | |
|---|---|---|---|---|
| 2022/0239451 | A1* | 7/2022 | Park | H04W 72/0453 |
| 2023/0371009 | A1* | 11/2023 | Dinan | H04L 1/06 |

FOREIGN PATENT DOCUMENTS

| | | | |
|---|---|---|---|
| CN | 109644519 | A | 4/2019 |
| CN | 110140374 | A | 8/2019 |
| CN | 110621043 | A | 12/2019 |
| CN | 110769467 | A | 2/2020 |
| EP | 3599791 | A1 | 1/2020 |
| KR | 20170139514 | A | 12/2017 |
| WO | 2019242658 | A1 | 12/2019 |

OTHER PUBLICATIONS

IEEE 802.11a-1999-IEEE Standard for Telecommunications and Information Exchange Between Systems—LAN/MAN Specific Requirements—Part 11: Wireless Medium Access Control (MAC) and physical layer (PHY) specifications: High Speed Physical Layer in the 5 GHz band, 90 pages.

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

International Search Report issued in corresponding International Application No. PCT/CN2021/088998, dated Jul. 6, 2021, pp. 1-13.

Korean Office Action issued in corresponding Korean Patent Application No. 2022-7041312, dated Mar. 17, 2025, pp. 1-18.

IEEE P802.11ax/D4.0 Draft Standard for Information technology Telecommunications and information exchange between systems Local and metropolitan area networks Specific requirements Part 11: Wireless LAN Medium Access Control (MAC) and Physical Layer (PHY) Specifications Amendment 1: Enhancements for High EfficiencyWLAN Prepared by the 802.11 Working Group of the LAN/MAN Standards Committee of the IEEE Computer Society, Feb. 2019, total 746 pages.

European Oral Proceedings Summons issued in corresponding European Application No. 21796309.9, dated Mar. 5, 2026, pp. 1-10.

* cited by examiner

COMMUNICATION METHOD AND COMMUNICATION APPARATUS

CROSS-REFERENCE TO RELATED APPLICATIONS

This application is a continuation of International Patent Application No. PCT/CN2021/088998, filed on Apr. 22, 2021, which claims priority to Chinese Patent Application No. 202010346204.6, filed on Apr. 27, 2020. The disclosures of the aforementioned applications are hereby incorporated by reference in their entireties.

TECHNICAL FIELD

This application relates to the communication field, and in particular, to a communication method and a communication apparatus.

BACKGROUND

IEEE 802.11 is one of mainstream wireless access standards and has been widely used in commercial applications in the past decade. An access point (access point, AP) accesses the Internet in a wired or wireless manner, the AP is associated with a plurality of stations, and uplink and downlink communication is performed between the AP and the associated stations by using the IEEE 802.11 protocol. The station may report a busy/available channel state of the station to the AP.

In the IEEE 802.11a standard, only a 20 MHz bandwidth is supported. Supported bandwidth has continuously increased with evolution to subsequent standards. In the IEEE 802.11n standard, a maximum bandwidth of 40 MHz is supported, and in the IEEE 802.11ac/ax standard, a maximum bandwidth of 160 MHz is supported. In the IEEE 11be standard, a maximum bandwidth is extended to 320 MHz.

Currently, a technology in which a station reports a channel state to an AP supports reporting of a channel state of a channel with a maximum bandwidth of 160 MHz, and cannot indicate a channel state of a channel with a larger bandwidth.

SUMMARY

This application provides a communication method and a communication apparatus, to indicate a channel state of a channel with a larger bandwidth, so as to meet a communication requirement of a larger bandwidth.

According to a first aspect, a communication method is provided, including: a first device (which may alternatively be a module or a chip in the first device) generates first control information, where the first control information includes a first field and a second field, the first field is used to indicate a channel state of a first subchannel in a first channel segment, and the second field is used to indicate a channel state of a second subchannel in a second channel segment; and the first device sends the first control information to a second device. In an embodiment of this application, the first control information carries the two fields, and the two fields each are used to indicate a channel state of a subchannel in a channel segment, to indicate a channel state of a channel with a larger bandwidth.

Optionally, that the first field is used to indicate a channel state of a first subchannel in a first channel segment includes: A first bitmap in the first field is used to indicate a channel state of each first subchannel in the first channel segment; and that the second field is used to indicate a channel state of a second subchannel in a second channel segment includes: A second bitmap in the second field is used to indicate a channel state of each second subchannel in the second channel segment.

According to a second aspect, a communication method is provided, including: A second device receives first control information from a first device, where the first control information includes a first field and a second field, the first field is used to indicate a channel state of a first subchannel in a first channel segment, and the second field is used to indicate a channel state of a second subchannel in a second channel segment; and determines channel state information of each channel based on the first control information. In an embodiment of this application, the first control information carries the two fields, and the two fields each are used to indicate a channel state of a subchannel in a channel segment, to indicate a channel state of a channel with a larger bandwidth.

Related description of the first field and the second field is the same as that in the first aspect. For details, refer to the first aspect.

A process in which the second device determines the channel state is an inverse process of behavior of the first device in the first aspect. The second device may learn of, based on the first control information, a channel state of each subchannel in the first channel segment and a channel state of each subchannel in the second channel segment that are reported by the first device.

According to a third aspect, a communication method is provided, including: A first device generates first control information, where a first bitmap in the first control information is used to indicate a channel state of a first subchannel in a first channel segment, and a first bit in the first control information is used to indicate a channel state of a second channel segment; and the first device sends the first control information to a second device. In an embodiment of this application, the first bitmap in the first control information is used to indicate the channel state of the first subchannel in the first channel segment, and the first bit in the first control information is used to indicate the channel state of the second channel segment, to indicate a channel state of a channel with a larger bandwidth.

In a possible implementation, a second bit in the first control information is used to indicate the first channel segment.

Optionally, that a first bit is used to indicate a channel state of a second channel segment includes: A value of the first bit is a first value, and the first value indicates that a channel state of a subchannel in the second channel segment is available; or a value of the first bit is a second value, and the second value indicates that a channel state of a subchannel in the second channel segment is busy or unavailable.

In another possible implementation, the first bitmap is used to indicate that the first channel segment is predefined by a protocol.

According to a fourth aspect, a communication method is provided, including: A second device receives first control information from a first device, where a first bitmap in the first control information is used to indicate a channel state of a first subchannel in a first channel segment, and a first bit in the first control information is used to indicate a channel state of a second channel segment; and determines channel state information of each channel based on the first control information. In an embodiment of this application, the first bitmap in the first control information is used to indicate the channel state of the first subchannel in the first channel segment, and the first bit in the first control information is used to indicate the channel state of the second channel segment, to indicate a channel state of a channel with a larger bandwidth.

In a possible implementation, a second bit in the first control information is used to indicate the first channel segment.

Optionally, that a first bit is used to indicate a channel state of a second channel segment includes: A value of the first bit is a first value, and the first value indicates that a channel state of a subchannel in the second channel segment is available; or a value of the first bit is a second value, and the second value indicates that a channel state of a subchannel in the second channel segment is busy or unavailable.

In another possible implementation, the first bitmap is used to indicate that the first channel segment is predefined by a protocol.

A process in which the second device determines the channel state is an inverse process of behavior of the first device in the third aspect. The second device may learn of, based on the first control information, a channel state of each subchannel in the first channel segment and a channel state of the second channel segment that are reported by the first device.

A process in which the second device determines the channel state is an inverse process of behavior of the first device in the third aspect. The second device may learn of, based on the first control information, a channel state of each subchannel in the first channel segment and a channel state of each subchannel in the second channel segment that are reported by the first device.

According to a fifth aspect, a communication method is provided, including: After receiving a bandwidth query report poll BQRP message, a first device sends a bandwidth query report BQR to a second device, where the BQR includes channel state information of a basic service set BSS operating channel bandwidth; and after receiving a first request to send frame, the first device sends the BQR to the second device. In an embodiment of this application, the BQR is reused, so that the BQR may also be replied when the first request to send frame is received, and a new frame type does not need to be introduced. The BQR has two functions. The BQR keeps an original function of responding to a BQRP trigger frame, to report channel state information; and a function of responding to the first request to send frame, to perform dynamic bandwidth negotiation.

Optionally, that the first device sends the BQR to the second device includes: The first device sends the BQR to the second device after a short interframe space SIFS time.

Optionally, after the first device receives the bandwidth query report poll BQRP message, the first device sends the bandwidth query report BQR to the second device, where the BQR is carried in a trigger-based physical layer protocol data unit TB PPDU; and after the first device receives the first request to send frame, the first device sends the BQR to the second device, where the BQR is carried in a non-high throughput physical layer protocol data unit PPDU or a non-high throughput duplicate physical layer protocol data unit PPDU. In other words, a frame format used by the first device to reply to the BQRP message by using the BQR is different from a frame format used by the first device to reply to the first request to send frame by using the BQR.

Optionally, after the first device receives the bandwidth query report poll BQRP message, the first device sends the bandwidth query report BQR to the second device, and before the first device sends the BQR to the second device, the method further includes: The first device determines that a subchannel on which a resource unit RU is located is in an available state; and after the first device receives the first request to send frame, the first device sends the BQR to the second device, and before the first device sends the BQR to the second device, the method further includes: The first device determines that a primary subchannel in the BSS operating channel bandwidth is in an available state. In other words, in a case in which the first device replies to the BQRP message by using the BQR, a busy/available state of a primary 20 MHz channel does not need to be considered. However, in a case in which the first device replies to the first request to send frame by using the BQR, the busy/available state of the primary 20 MHz channel needs to be considered.

Optionally, after receiving the bandwidth query report poll BQRP message, the first device sends the bandwidth query report BQR to the second device, and the method further includes: The first device senses each channel in the BSS operation channel bandwidth in the short interframe space SIFS time after the first device receives a PPDU carrying the BQRP message; and after receiving the first request to send frame, the first device sends the BQR to the second device, and the method further includes: The first device senses each channel in the BSS operation channel bandwidth in a point coordination function interframe space PIFS time before the first device receives a PPDU carrying the first request to send frame. In other words, in the case in which the BQRP message is replied by using the BQR and in a case in which the BQR is replied by using the first request to send frame, the first device performs channel sensing on different occasions.

Optionally, the method further includes: The first device determines that a value of a first network allocation vector NAV is 0. In other words, when replying to the BQR, the first device may further consider the value of the first NAV, and reply to the BQR when the value of the first NAV is 0.

According to a sixth aspect, a communication method is provided, including: After sending a bandwidth query report poll (bandwidth query report poll, BQRP) message, a second device receives a BQR; and after sending a first request to send frame, the second device receives the BQR. In an embodiment of this application, the BQR is reused, so that the BQR may also be replied when the first request to send frame is received, and a new frame type does not need to be introduced. The BQR has two functions. The BQR keeps an original function of responding to a BQRP trigger frame, to report channel state information; and a function of responding to the first request to send frame, to perform dynamic bandwidth negotiation.

Optionally, after sending the bandwidth query report poll BQRP message, the second device receives the BQR, where the BQR is carried in a trigger-based physical layer protocol data unit TB PPDU; and after sending the first request to send frame, the second device receives the BQR, where the BQR is carried in a non-high throughput physical layer protocol data unit PPDU or a non-high throughput duplicate physical layer protocol data unit PPDU. In other words, a frame format used by the first device to reply to the BQRP message by using the BQR is different from a frame format used by the first device to reply to the first request to send frame.

According to a seventh aspect, a communication apparatus is provided. The apparatus includes a unit configured to perform the method in any one of the first aspect or the possible implementations of the first aspect, a unit configured to perform the method in any one of the second aspect or the possible implementations of the second aspect, a unit configured to perform the method in any one of the third aspect or the possible implementations of the third aspect, a unit configured to perform the method in any one of the fourth aspect or the possible implementations of the fourth aspect, a unit configured to perform the method in any one of the fifth aspect or the possible implementations of the fifth aspect, or a unit configured to perform the method in any one of the sixth aspect or the possible implementations of the sixth aspect.

According to an eighth aspect, a communication apparatus is provided. The apparatus includes a processor and a transceiver; and the processor is coupled to the transceiver, and is configured to implement the method in any one of the possible implementations of the first aspect, the method in any one of the possible implementations of the third aspect, or the method in any one of the possible implementations of the fifth aspect.

In an implementation, the apparatus is a first device or a chip configured in the first device. When the apparatus is the chip configured in the first device, the transceiver may be an input/output interface.

Optionally, the transceiver may be a transceiver circuit. Optionally, the input/output interface may be an input/output circuit.

Optionally, there may be one or more processors.

Optionally, the apparatus further includes a memory. The processor is coupled to the memory, and may be configured to execute instructions in the memory. There may be one or more memories. Optionally, the memory may be integrated with the processor, or the memory and the processor may be separately disposed.

In a specific implementation process, the memory may be a non-transitory (non-transitory) memory, for example, a read-only memory (read-only memory, ROM). The memory and the processor may be integrated into one chip, or may be disposed in different chips. A type of the memory and a manner of disposing the memory and the processor are not limited in this embodiment of this application.

The apparatus in the eighth aspect may be a chip, and the processor may be implemented by using hardware or by using software. When implemented by using hardware, the processor may be a logic circuit, an integrated circuit, or the like. When the implemented by using software, the processor may be a general-purpose processor, and is implemented by reading software code stored in the memory. The memory may be integrated into the processor, or may be independently located outside the processor.

According to a ninth aspect, a communication apparatus is provided. The apparatus includes a processor and a transceiver; and the processor is coupled to the transceiver, and is configured to implement the method in any one of the possible implementations of the second aspect, the method in any one of the possible implementations of the fourth aspect, or the method in any one of the possible implementations of the sixth aspect.

In an implementation, the apparatus is a second device or a chip configured in the second device. When the apparatus is the chip configured in the second device, the transceiver may be an input/output interface.

Optionally, the transceiver may be a transceiver circuit. Optionally, the input/output interface may be an input/output circuit.

Optionally, there may be one or more processors.

Optionally, the apparatus further includes a memory. The processor is coupled to the memory, and may be configured to execute instructions in the memory. There may be one or more memories. Optionally, the memory may be integrated with the processor, or the memory and the processor may be separately disposed.

In a specific implementation process, the memory may be a non-transitory memory, for example, a read-only memory ROM. The memory and the processor may be integrated into one chip, or may be disposed in different chips. A type of the memory and a manner of disposing the memory and the processor are not limited in this embodiment of this application.

The apparatus in the ninth aspect may be a chip, and the processor may be implemented by using hardware or by using software. When implemented by using hardware, the processor may be a logic circuit, an integrated circuit, or the like. When the implemented by using software, the processor may be a general-purpose processor, and is implemented by reading software code stored in the memory. The memory may be integrated into the processor, or may be independently located outside the processor.

According to a tenth aspect, a communication apparatus is provided. The apparatus includes a processing circuit and a transceiver circuit. The processing circuit is configured to send and receive a signal through the transceiver circuit, so that the processing circuit performs the method in any possible implementation of any one of the first aspect to the sixth aspect.

In a specific implementation process, the transceiver circuit may include an input circuit and an output circuit. The input circuit may be an input pin, and the output circuit may be an output pin. The processing circuit may be a transistor, a gate circuit, a trigger, various logic circuits, or the like. An input signal received by the input circuit may be received and input by, for example, but not limited to, a receiver; a signal output by the output circuit may be output to, for example, but not limited to, a transmitter and transmitted by the transmitter; and the input circuit and the output circuit may be a same circuit, where the circuit is used as the input circuit and the output circuit at different moments. Specific implementations of the processing circuit and the various circuits are not limited in this embodiment of this application.

According to an eleventh aspect, a computer-readable storage medium is provided. The computer-readable storage medium stores a computer program or instructions, and when the computer program or the instructions is/are executed, the method in any possible implementation of any one of the first aspect to the sixth aspect is implemented.

According to a twelfth aspect, a computer program product including instructions is provided. When the instructions are run, the method in any possible implementation of any one of the first aspect to the sixth aspect is implemented.

According to a thirteenth aspect, a communication chip is provided, where instructions are stored in the communication chip. When the instructions are run on a computer device, the communication chip is enabled to perform the method in any one of the first aspect or the possible implementations of the first aspect, the method in any one of the third aspect or the possible implementations of the third aspect, or the method in any one of the fifth aspect or the possible implementations of the fifth aspect.

According to a fourteenth aspect, a communication chip is provided, where instructions are stored in the communication chip. When the instructions are run on a computer device, the communication chip is enabled to perform the method in any one of the second aspect or the possible implementations of the second aspect, the method in any one of the fourth aspect or the possible implementations of the fourth aspect, or the method in any one of the sixth aspect or the possible implementations of the sixth aspect.

According to a fifteenth aspect, a communication system is provided. The communication system includes a first device and a second device.

Optionally, the communication system further includes another device that communicates with the first device and/or the second device.

DESCRIPTION OF EMBODIMENTS

Figure 1:
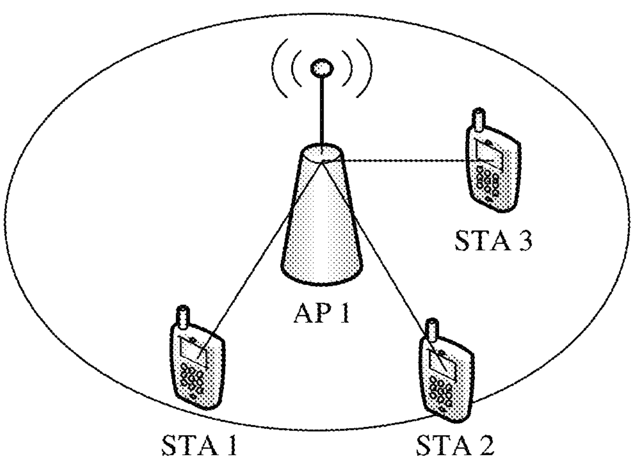
FIG. 1 is a schematic diagram of a scenario to which this application is applied.

The following describes technical solutions of this application with reference to accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a Wi-Fi™ system, a wireless local area network (wireless local area network, WLAN), a worldwide interoperability for microwave access (worldwide interoperability for microwave access, WiMAX™) communication system, a 5th generation (5th generation, 5G) system, a new radio (new radio, NR) system, or a device-to-device (device-to-device, D2D) system.

In a communication system, if a device sends data to another device or receives data from another device, the another device receives the data from the device sending the data, and/or sends the data to the device sending the data.

The technical solutions provided in the embodiments of this application can be applied to wireless communication between communication devices. The wireless communication between the communication devices may include: wireless communication between a network device and a terminal device, wireless communication between network devices, and wireless communication between terminal devices. In the embodiments of this application, the term "wireless communication" may be shortly referred to as "communication", and the term "communication" may also be described as "data transmission", "information transmission", or "transmission".

The terminal device may be a station (station, STA), user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

The network device may be a device configured to communicate with the terminal device, and may also be referred to as a radio access network (radio access network, RAN) device or the like. The network device includes but is not limited to an access point (access point, AP), a next generation NodeB (next generation NodeB, gNB) in 5G, an evolved NodeB (evolved NodeB, eNB), a baseband unit (baseband unit, BBU), a transmit/receive point (transmit/receive point, TRP), a transmit point (transmit point, TP), a relay station, and the like. Alternatively, the network device may be a radio controller in a cloud radio access network (cloud radio access network, CRAN) scenario. In addition, the network device may further be responsible for functions such as radio resource management, quality of service (quality of service, QoS), and data compression and encryption on an air interface side. The network device may support at least one wireless communication technology, for example, LTE or NR.

In some deployments, the gNB may include a centralized unit (centralized unit, CU) and a distributed unit (distributed unit, DU). The gNB may further include an active antenna unit (active antenna unit, AAU). The CU implements some functions of the gNB, and the DU implements some functions of the gNB. For example, the CU is responsible for processing a non-real-time protocol and service, and implements functions of radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information about the RRC layer eventually becomes information about the PHY layer, or is transformed from information about the PHY layer. Therefore, in this architecture, higher layer signaling, such as RRC layer signaling, may also be considered to be sent by the DU, or sent by the DU and the AAU. It may be understood that the network device may be a device including one or more of a CU node, a DU node, and an AAU node. In addition, the CU may be classified into a network device in an access network (radio access network, RAN), or may be classified into a network device in a core network (core network, CN). This is not limited in this application.

In the embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). An operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a function module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD), or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but are not limited to a radio channel and various other media that can store, include, and/or carry instructions and/or data.

FIG. 1 is a schematic diagram of a scenario to which this application is applied. As shown in FIG. 1, the scenario includes an AP 1, a STA 1, a STA 2, and a STA 3. Uplink and downlink communication may be performed between an AP and a STA. An AP accesses the Internet in a wired or wireless manner, the AP is associated with a plurality of STAs, and uplink and downlink communication is performed between the AP and the associated STAs by using the IEEE 802.11 protocol.

It may be understood that a quantity of APs or STAs in FIG. 1 is not limited in this application, and an example in FIG. 1 is merely an example for description.

In the IEEE 802.11be standard, the STA may report a busy/available channel state of the STA to the AP by using a bandwidth query report (bandwidth query report, BQR) control (control) subfield. A current BQR includes an 8-bit bitmap (bitmap) (or referred to as a bitmap), and each bit corresponds to a 20 MHz channel. Therefore, a state of a channel with a maximum bandwidth of 160 MHz may be indicated. A state of a channel with a total bandwidth greater than 160 MHz, for example, 320 MHz or 240 MHz, cannot be indicated.

The following briefly describes terms or concepts in the embodiments of this application.

A high throughput (high throughput, HT) control field exists in a data frame. There are three types of HT control fields, which are distinguished by bits B0 and B1. When B0=0, a corresponding HT control field is an HT control field of an HT type. When B0=1 and B1=0, a corresponding HT control field is an HT control field of a very high throughput (very high throughput, VHT) type. When B0=1 and B1=1, a corresponding HT control field is an HT control field of a high efficiency (high efficiency, HE) type. Parts B2 to B31 in the HT control field of the HE type are referred to as an A-control subfield. The A-control subfield includes one or more control subfields. Each control subfield includes a 4-bit control ID subfield. Control IDs have different types, and control information (control information) corresponding to each type occupies a specific quantity of bits.

BQR control is a control type of the A-control subfield. A length of control information subfield corresponding to the BQR control is 10 bits. The first 8 bits in the 10 bits are an available channel bitmap (available channel bitmap) subfield. Each of the 8 bits indicates to send a channel state of a 20 MHz subchannel in a basic service set (basic service set, BSS) operating channel bandwidth (operating channel bandwidth) in which a station is located. A least significant bit (least significant bit, LSB) corresponds to a 20 MHz subchannel at a lowest frequency. For example, that a bit x (x is any bit in 8 bits) is set to 1 indicates that an $(x+1)^{th}$ 20 MHz subchannel is available; or, that the bit is set to 0 indicates that a corresponding 20 MHz subchannel is busy or unavailable (unavailable). A busy/available state of each 20 MHz subchannel is determined based on clear channel assessment-energy detection (energy detection-based clear channel assessment, ED-based CCA). The last 2 bits in the 10 bits of the control information subfield corresponding to the BQR control are reserved bits.

A larger bandwidth in this embodiment of this application is a bandwidth greater than 160 MHz, for example, a 240 MHz bandwidth or a 320 MHz bandwidth.

A 320 MHz channel may include one consecutive 320 MHz channel, or may include two inconsecutive 160 MHz channels. A 240 MHz channel may include one consecutive 240 MHz channel, or may include a 160 MHz channel and an 80 MHz channel.

Figure 2:
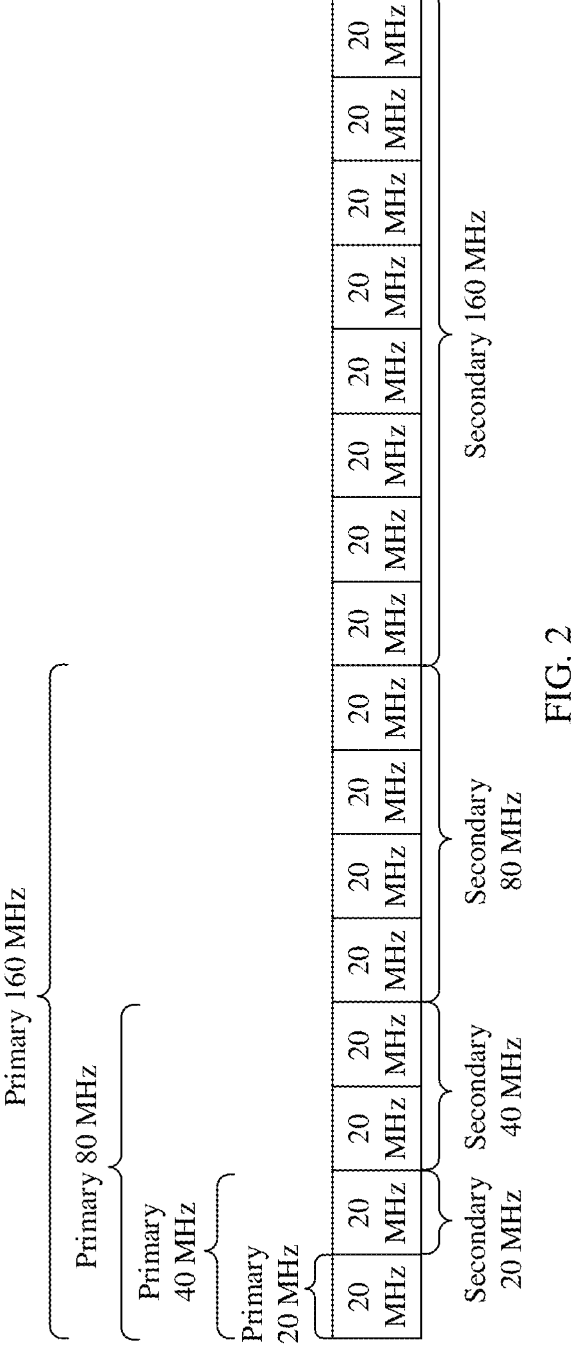
FIG. 2 is a schematic diagram of a primary subchannel and a secondary subchannel.

Regardless of a bandwidth composition mode, only one 20 MHz subchannel is referred to as a primary 20 MHz subchannel. For example, a 40 MHz channel in which the primary 20 MHz subchannel is located is referred to as a primary 40 MHz subchannel. An 80 MHz channel in which the primary 20 MHz subchannel is located is referred to as a primary 80 MHz subchannel. A 160 MHz channel in which the primary 20 MHz is located is referred to as a primary 160 MHz subchannel The following describes definitions of a primary subchannel and a secondary subchannel in a 320 MHz channel by using FIG. 2. As shown in FIG. 2, a 20 MHz subchannel in a primary 40 MHz subchannel other than a primary 20 MHz subchannel is referred to as a secondary 20 MHz subchannel. A 40 MHz subchannel in a primary 80 MHz subchannel other than the primary 40 MHz subchannel is referred to as a secondary 40 MHz subchannel. An 80 MHz subchannel in a primary 160 MHz subchannel other than the primary 80

MHz subchannel is referred to as a secondary 80 MHz subchannel. A 160 MHz subchannel in a 320 MHz subchannel other than the primary 160 MHz subchannel is referred to as a secondary 160 MHz subchannel.

The following describes definitions of a primary subchannel and a secondary subchannel in a 240 MHz channel.

For a consecutive 240 MHz channel, an 80 MHz subchannel in a primary 160 MHz subchannel other than a primary 80 MHz subchannel is referred to as a first secondary 80 MHz subchannel, and an 80 MHz subchannel in the 240 MHz channel other than the primary 160 MHz subchannel is referred to as a second secondary 80 MHz subchannel.

For a 240 MHz channel including a 160 MHz channel and an 80 MHz channel, when a primary 20 MHz subchannel is in a 160 MHz subchannel, the 160 MHz subchannel is referred to as a primary 160 MHz subchannel. An 80 MHz subchannel including the primary 20 MHz subchannel in the 160 MHz subchannel is referred to as a primary 80 MHz subchannel, an 80 MHz subchannel in the 160 MHz subchannel other than the 80 MHz subchannel including the primary 20 MHz subchannel is referred to as a first secondary 80 MHz subchannel, and an 80 MHz subchannel in the 240 MHz channel other than the primary 160 MHz subchannel is referred to as a second secondary 80 MHz subchannel.

For a 240 MHz channel including a 160 MHz channel and an 80 MHz channel, when a primary 20 MHz subchannel is in an 80 MHz subchannel, the 80 MHz subchannel is referred to as a primary 80 MHz subchannel, and a 160 MHz subchannel in the 240 MHz subchannel other than the primary 80 MHz subchannel is referred to as a secondary 160 MHz subchannel. In this case, a secondary 80 MHz subchannel does not exist.

A general description is provided herein. A first device and a second device in the embodiments of this application are communication devices in a communication system. The communication device may perform wireless communication by using an air interface resource. The communication device may include a network device and a terminal device, and the network device may also be referred to as a network-side device. The air interface resource may include at least one of a time domain resource, a frequency domain resource, a code resource, and a spatial resource. In the embodiments of this application, "at least one" may also be "one or more", and "a plurality of" may be two, three, four, or more. This is not limited in this application.

For example, the first device and the second device may be communication devices in Wi-Fi™. For example, the first device may be an AP or a non-AP station (for example, a STA). The second device may be an AP or a non-AP station. For example, the first device and the second device may be the AP and the STA in FIG. 1. That the first device is the AP or the STA and the second device is the AP or the STA is not specifically limited.

This application provides a communication method. One piece of control information carries two fields, and each field indicates a channel state of a subchannel in a channel segment, to indicate a channel state of a channel with a larger bandwidth.

The following describes the communication method according to this application with reference to FIG. 3 to FIG. 10.

Figure 3:
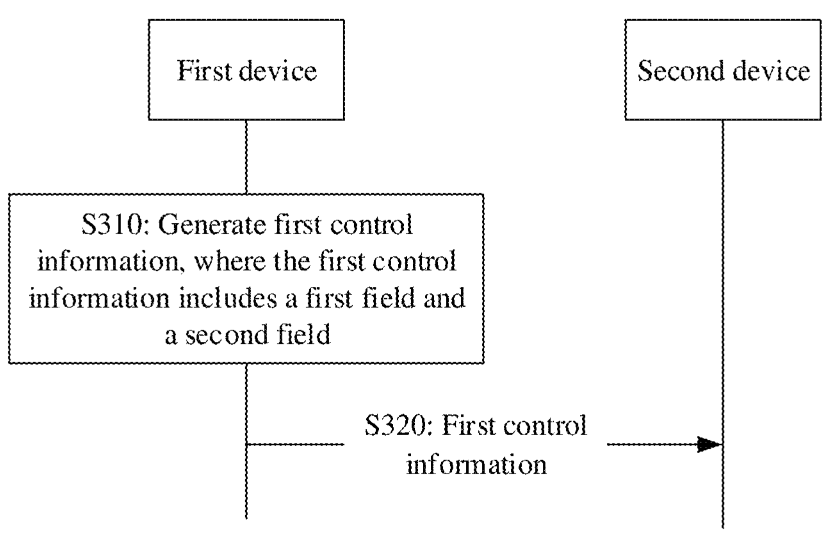
FIG. 3 is a schematic diagram of a communication method according to an embodiment of this application.

FIG. 3 is a schematic diagram of a communication method 300 according to an embodiment of this application. As shown in FIG. 3, the method 300 includes the following steps.

S310: A first device generates first control information, where the first control information includes a first field and a second field, the first field is used to indicate a channel state of a first subchannel in a first channel segment, and the second field is used to indicate a channel state of a second subchannel in a second channel segment.

The first control information may include the two fields, and each field indicates a channel state of each subchannel in a channel segment. For example, the first control information may be an A-control subfield, and the first field and the second field may be BQR control subfields. In other words, the A-control subfield may include the two BQR control subfields.

It may be understood that a total bandwidth includes the first channel segment and the second channel segment. For example, two channel segments included in a 240 MHz channel may be a 160 MHz channel and an 80 MHz channel (or subchannel). For another example, two channel segments included in a 320 MHz channel may be a 160 MHz channel and a 160 MHz channel. It may be understood that the first channel segment and the second channel segment may be the same or different. This is not specifically limited.

The channel state of the first subchannel in the first channel segment may be understood as a channel state of each of a plurality of subchannels included in the first channel segment. For example, a 160 MHz channel has eight 20 MHz subchannels, which may also be understood as that a granularity is 20 MHz. To be specific, the first subchannel is a 20 MHz subchannel. For another example, an 80 MHz channel has four 20 MHz subchannels, which may also be understood as that a granularity is 20 MHz. To be specific, the first subchannel is a 20 MHz subchannel.

The first subchannel may alternatively be of another value, for example, a subchannel granularity or a subchannel bandwidth in the S1G standard. In the S1G standard (IEEE 802.11ah), the subchannel granularity is 2 MHz, 4 MHz, 8 MHz, or 16 MHz, and the subchannel bandwidth is 2 MHz. When the subchannel granularity or the subchannel bandwidth in the S1G standard is extended to 32 MHz or 24 MHz, a channel segment of the S1G standard may be 16 MHz or 8 MHz, and the subchannel bandwidth or the granularity is 2 MHz.

It may be understood that the foregoing description about "the channel state of the first subchannel in the first channel segment" is also applicable to "the channel state of the second subchannel in the second channel segment". The description about the first subchannel is also applicable to the second subchannel.

It may further be understood that the first subchannel and the second subchannel may be the same or different. This is not specifically limited.

Optionally, that the first field is used to indicate a channel state of a first subchannel in a first channel segment includes: A first bitmap in the first field is used to indicate a channel state of each first subchannel in the first channel segment; and that the second field is used to indicate a channel state of a second subchannel in a second channel segment includes: A second bitmap in the second field is used to indicate a channel state of each second subchannel in the second channel segment.

The first bitmap includes a plurality of bits, and each bit may indicate a channel state of one subchannel. The channel state may include an available state or a busy state (or an unavailable state).

It may be understood that a quantity of bits included in the first bitmap may be the same as or different from a quantity of bits included in the second bitmap. This is not specifically limited.

For example, the first control information may be an A-control subfield in an HT control field of an HE type. The first field and the second field may be BQR control subfields, and each BQR control subfield indicates a channel state of a subchannel in a channel segment.

Figure 4:
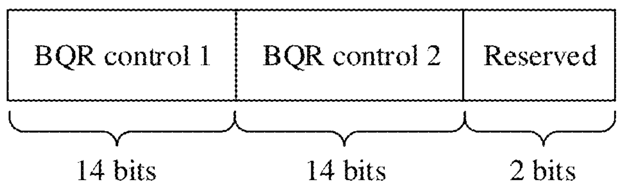
FIG. 4 is a schematic diagram of a control field according to an embodiment of this application.

An example in FIG. 4 is used for description herein. One A-control subfield carries two BQR control subfields. As shown in FIG. 4, the A-control subfield includes a BQR control 1 subfield, a BQR control 2 subfield, and reserved bits. Each BQR control subfield indicates a channel state of a subchannel in a channel segment. For example, the BQR control 1 subfield indicates a channel state of each subchannel in the first channel segment. The BQR control 2 subfield indicates a channel state of each subchannel in the second channel segment. The BQR control 1 subfield occupies 14 bits, the BQR control 2 subfield occupies 14 bits, and the reserved bits are 2 bits.

For a 320 MHz channel, both the first channel segment and the second channel segment may be 160 MHz. For example, if a BSS operating bandwidth is 320 MHz, when one A-control subfield carries two BQR control subfields, a first BQR control subfield is used to indicate a state of each 20 MHz subchannel in a lower 160 MHz channel, and a second BQR control subfield is used to indicate a state of each 20 MHz subchannel in a higher 160 MHz channel.

Alternatively, if a BSS operating bandwidth is 320 MHz, when one A-control subfield carries two BQR control subfields, a first BQR control subfield is used to indicate a state of each 20 MHz subchannel in a primary 160 MHz channel, and a second BQR control subfield is used to indicate a state of each 20 MHz subchannel in a secondary 160 MHz channel.

For a 240 MHz channel, the first channel segment and the second channel segment may respectively be 160 MHz and 80 MHz. For example, if a BSS operating bandwidth is 240 MHz, when one A-control subfield carries two BQR control subfields, a first BQR control subfield is used to indicate a state of each 20 MHz subchannel in a lower 160 MHz channel, and a second BQR control subfield is used to indicate a state of each 20 MHz subchannel in a highest 80 MHz channel.

Alternatively, if a BSS operating bandwidth is 240 MHz, when one A-control subfield carries two BQR control subfields, a first BQR control subfield is used to indicate a state of each 20 MHz subchannel in a lower 80 MHz channel, and a second BQR control subfield is used to indicate a state of each 20 MHz subchannel in a higher 160 MHz channel.

Alternatively, if a BSS operating bandwidth is 240 MHz, when one A-control subfield carries two BQR control subfields, a first BQR control subfield is used to indicate a state of each 20 MHz subchannel in a primary 160 MHz channel, and a second BQR control subfield is used to indicate a state of each 20 MHz subchannel in an 80 MHz channel other than the primary 160 MHz channel.

Alternatively, if a BSS operating bandwidth is 240 MHz, when one A-control subfield carries two BQR control subfields, a first BQR control subfield is used to indicate a state of each 20 MHz subchannel in a primary 80 MHz channel, and a second BQR control subfield is used to indicate a state of each 20 MHz subchannel in a 160 MHz channel other than the primary 80 MHz channel.

S320: The first device sends the first control information to a second device. Correspondingly, the second device receives the first control information.

The second device may learn of, based on the first control information, the channel state of the first subchannel in the first channel segment and the channel state of the second subchannel in the second channel segment that are reported by the first device.

Unified description is provided herein. In the embodiments of this application, the first device may report the first control information to the second device in an unsolicited (unsolicited) manner, or may report the first control information in a solicited (solicited) manner. This is not limited. The solicited manner means that the first device is requested by the second device.

In this embodiment of this application, the first control information includes the first field and the second field, to indicate a channel state of a channel with a total bandwidth greater than 160 MHz (for example, 240 MHz or 320 MHz), so as to meet a communication requirement of a larger bandwidth. In addition, because both the first field and the second field are carried in the first control information, the first field and the second field may use a type of BQR control in a current standard, and a new type of BQR control does not need to be introduced. In this way, the first field and the second field may share one control ID. This saves control IDs.

Optionally, a granularity of the channel state indicated in this embodiment of this application may be 20 MHz. Because CCA is based on 20 MHz, the first device may accurately indicate a busy/available state of each 20 MHz subchannel in the channel with the total bandwidth greater than 160 MHz.

The foregoing describes a case in which the A-control subfield includes the two BQR control subfields. This application further provides a communication method. The A-control subfield includes one BQR control subfield, to indicate the state of the channel with the total bandwidth greater than 160 MHz.

Figure 5:
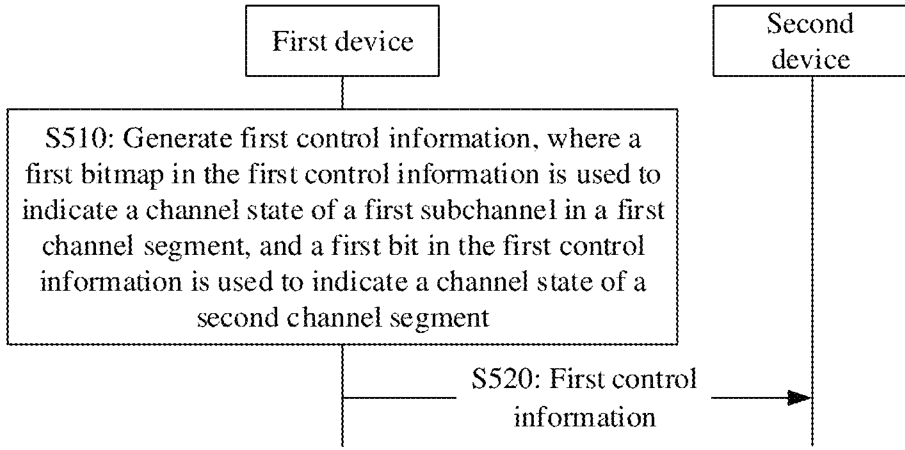
FIG. 5 is a schematic diagram of another communication method according to an embodiment of this application.

FIG. 5 is a schematic diagram of a communication method 500 according to an embodiment of this application. As shown in FIG. 5, the method 500 includes the following steps.

S510: A first device generates first control information, where a first bitmap in the first control information is used to indicate a channel state of a first subchannel in a first channel segment, and a first bit in the first control information is used to indicate a channel state of a second channel segment.

For example, the first control information is an A-control subfield, and the A-control subfield includes one BQR control subfield. The first bit may be one or more reserved bits, and is used to indicate the channel state of the second channel segment. It is clear that in the foregoing embodiment, the first control information includes two BQR control subfields, the reserved bit does not need to be occupied to indicate the channel state of the second channel segment, and the reserved bit may be used for another purpose.

Implementations of the first channel segment and the second channel segment are described herein with reference to Table 1 and Table 2.

Table 1 shows the implementations of the first channel segment and the second channel segment when a BSS operating bandwidth is 320 MHz. For details, refer to Table 1.

TABLE 1

| First channel segment | Second channel segment |
|---|---|
| Lower 160 MHz | Higher 160 MHz |
| Higher 160 MHz | Lower 160 MHz |
| Primary 160 MHz | Secondary 160 MHz |
| Secondary 160 MHz | Primary 160 MHz |

As shown in Table 1, when the first channel segment is a lower 160 MHz subchannel, the second channel segment is a higher 160 MHz subchannel. When the first channel segment is a higher 160 MHz subchannel, the second channel segment is a lower 160 MHz subchannel. When the first channel segment is a primary 160 MHz subchannel, the second channel segment is a secondary 160 MHz subchannel. When the first channel segment is a secondary 160 MHz subchannel, the second channel segment is a primary 160 MHz subchannel.

Table 2 shows the implementations of the first channel segment and the second channel segment when the BSS operating bandwidth is 240 MHz. For details, refer to Table 2.

TABLE 2

| First channel segment | Second channel segment |
|---|---|
| Lower 160 MHz | Higher 80 MHz |
| Higher 80 MHz | Lower 160 MHz |
| Lower 80 MHz | Higher 160 MHz |
| Higher 160 MHz | Lower 160 MHz |
| Primary 160 MHz | 80 MHz in the 240 MHz other than the primary 160 MHz |
| 80 MHz in the 240 MHz other than the primary 160 MHz | Primary 160 MHz |
| Primary 80 MHz | Secondary 160 MHz |
| Secondary 160 MHz | Primary 80 MHz |

As shown in Table 2, when the first channel segment is a lower 160 MHz subchannel, the second channel segment is a highest 80 MHz subchannel. When the first channel segment is a higher 80 MHz subchannel, the second channel segment is a lower 160 MHz subchannel. When the first channel segment is a lowest 80 MHz subchannel, the second channel segment is a higher 160 MHz subchannel. When the first channel segment is a higher 160 MHz subchannel, the second channel segment is a lowest 80 MHz subchannel. When the first channel segment is a primary 160 MHz subchannel, the second channel segment is an 80 MHz subchannel in the 240 MHz subchannel other than the primary 160 MHz subchannel. When the first channel segment is an 80 MHz subchannel in the 240 MHz subchannel other than the primary 160 MHz subchannel, the second channel segment is a primary 160 MHz subchannel. When the first channel segment is a primary 80 MHz subchannel, the second channel segment is a secondary 160 MHz subchannel, namely, a 160 MHz subchannel in the 240 MHz subchannel other than the primary 80 MHz subchannel. When the first channel segment is a secondary 160 MHz subchannel, namely, a 160 MHz subchannel in the 240 MHz subchannel other than the primary 80 MHz subchannel, the second channel segment is a primary 80 MHz subchannel.

S520: The first device sends the first control information to a second device. Correspondingly, the second device receives the first control information.

The second device may learn of, based on the first control information, the channel state of the first subchannel in the first channel segment and the channel state of the second subchannel in the second channel segment that are reported by the first device.

In this embodiment of this application, the first control information includes the first bitmap and the first bit, to indicate a channel state of a channel with a total bandwidth greater than 160 MHz (for example, 240 MHz or 320 MHz), so as to meet a communication requirement of a larger bandwidth. The first control information includes one BQR control subfield. The BQR control subfield may be of a type of BQR control in a current standard. The first bitmap is the first 8 bits in the BQR control subfield, and reserved bits in the BQR control subfield may be used to indicate the channel state of the second channel segment. No extra overhead is required.

Optionally, that a first bit is used to indicate a channel state of a second channel segment includes: A value of the first bit is a first value, and the first value indicates that a channel state of a subchannel in the second channel segment is available; or a value of the first bit is a second value, and the second value indicates that a channel state of a subchannel in the second channel segment is busy or unavailable. Herein, the first value or the second value indicates a channel state of each subchannel in the second channel segment. For example, when the first value is 1, it indicates that a channel state of each subchannel in a plurality of subchannels (or all subchannels) in the second channel segment is available. For another example, when the second value is 0, it indicates that a channel state of each subchannel in a plurality of subchannels (or all subchannels) in the second channel segment is busy or unavailable.

In this embodiment of this application, the first bit may be one reserved bit, or may be 2 reserved bits. This is not limited.

Figures 6, 7, 8, 9:
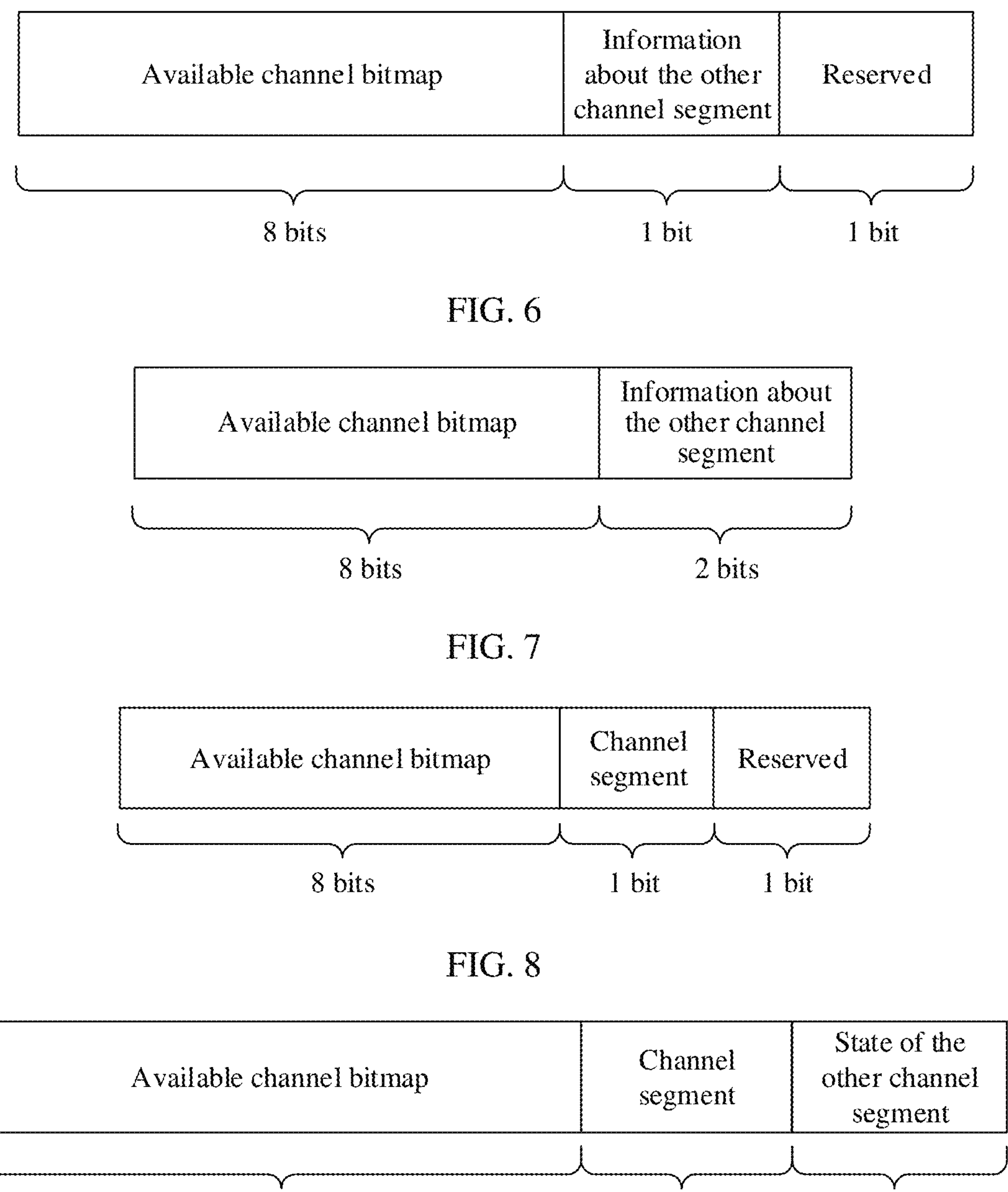
FIG. 6 is a schematic diagram of a BQR according to an embodiment of this application.
FIG. 7 is a schematic diagram of another BQR according to an embodiment of this application.
FIG. 8 is a schematic diagram of still another BQR according to an embodiment of this application.
FIG. 9 is a schematic diagram of yet another BQR according to an embodiment of this application.

A case in which the first bit is one reserved bit is described with reference to the schematic diagram in FIG. 6. It is assumed that an A-control subfield includes only one BQR control subfield. As shown in FIG. 6, in 10 bits included in the BQR control subfield, the first 8 bits are an available channel bitmap (available channel bitmap), and are used to indicate busy/available state information of the first channel segment. In addition, the last 2 bits in the 10 bits are originally reserved bits, where one reserved bit (the first bit) is used to indicate busy/available state information of the second channel segment, and the another reserved bit may be used as a reserved bit or another user. For example, the reserved bit used to indicate the busy/available state information of the second channel segment may be referred to as an information about the other channel segment (information for the other channel segment) subfield. It may be understood that the information about the other channel segment subfield may alternatively be of another name, which does not affect a function.

For example, an indication manner of the information about the other channel segment subfield in FIG. 6 is as follows: When a value of the subfield is the first value (for example, the value is 1), it indicates that all 20 MHz channels in the other channel segment (namely, the second channel segment) are available. When the value of the subfield is the second value (for example, the value is 0), it indicates that all 20 MHz channels in the other channel segment are busy or unavailable.

A case in which the first bit is 2 reserved bits is described with reference to the schematic diagram in FIG. 7. It is assumed that the A-control subfield includes only one BQR control subfield. As shown in FIG. 7, in 10 bits included in the BQR control subfield, the first 8 bits are an available channel bitmap, and are used to indicate busy/available state information of the first channel segment. In addition, the last 2 bits in the 10 bits are originally reserved bits. Herein, the last 2 bits (namely, the first bit) are used to indicate busy/available state information of the other channel segment (namely, the second channel segment). The last 2 bits are referred to as an information about the other channel segment subfield.

For example, an indication manner of the information about the other channel segment subfield in FIG. 7 is as follows: When a value of the 2 reserved bits is the first value (for example, the value is 11), it indicates that all 20 MHz channels in the other channel segment (namely, the second channel segment) are available. When the value of the 2 reserved bits is the second value (for example, the value is 00), it indicates that all the 20 MHz channels in the other channel segment are busy or unavailable. A third value (for example, a value is 10) and a fourth value (for example, a value is 01) are reserved values. Herein, although 2 reserved bits are occupied, values of the reserved bits may include a value used for another purpose. In other words, not only the channel state of the second channel segment is indicated, but also a reserved function may be implemented.

Both the third value and the fourth value are used as reserved values, but are not limited thereto. There may be another implementation for the third value and the fourth value. For example, another indication manner of the information about the other channel segment subfield in FIG. 7 is as follows: When the value of the 2 reserved bits is the first value (for example, the value is 11), it indicates that all the 20 MHz channels in the other channel segment (namely, the second channel segment) are available. When the value of the 2 reserved bits is the second value (for example, the value is 00), it indicates that all the 20 MHz channels in the other channel segment are busy or unavailable. When the value of the 2 reserved bits is the third value (for example, the value is 01), it indicates that information indicating the channel status of the other channel segment is not carried. The fourth value (for example, the value is 10) is a reserved value.

When the value of the 2 reserved bits is the third value, it means that for some reasons, information about the other channel segment (namely, the second channel segment) needs to be fed back through another channel or by using a next BQR. For example, a possible reason includes: The A-control subfield carries another type of control information, and therefore, there is no more space to carry a second BQR to indicate channel state information of the other channel segment; or the other channel segment is measured by using another module, and state information of the other channel segment is not obtained in time during this feedback.

It may be understood that regardless of the case in which the first bit is one reserved bit or the case in which the first bit is 2 reserved bits, values of the foregoing bits and meanings corresponding to the values are merely examples for description, and do not constitute a limitation on this embodiment of this application. A person skilled in the art may obtain different embodiments based on the foregoing implementations.

It is clear that regardless of the case in FIG. 6 or the case in FIG. 7, if the A-control subfield includes two BQR control subfields, the 2 reserved bits are still used as reserved bits or for other purposes, but are not used to indicate a busy/available status of the other channel segment.

Optionally, a second bit in the first control information is used to indicate the first channel segment. The second bit may be a reserved bit. In other words, the reserved bit may be used to indicate a channel segment for which the BQR control subfield carried in the first control information is used. In this way, in comparison with a case in which the first control information carries two BQR control subfields, a channel segment does not need to be identified by using locations of the two BQR control subfields. Therefore, the first control information may carry any BQR control subfield.

An example in FIG. 8 is used for description. It is assumed that the A-control subfield includes only one BQR control subfield. As shown in FIG. 8, in 10 bits included in the BQR control subfield, the first 8 bits are an available channel bitmap, and are used to indicate the busy/available state information of the first channel segment. In addition, the last 2 bits in the 10 bits are originally reserved bits, where one reserved bit (the second bit) is used to indicate the first channel segment, and the other reserved bit is used as a reserved bit or for another purpose. The reserved bit used to indicate the first channel segment may be referred to as a channel segment (channel segment) subfield, or may be referred to as a higher/lower channel segment (for example, 160 MHz or 80 MHz) subfield, or may be referred to as another name. This is not limited.

Different values of the second bit may indicate different channel segments. An example in which the second bit is a channel segment subfield is used below to describe a channel segment indicated by the first 8 bits of the BQR control subfield in FIG. 8.

For example, when the BSS operating bandwidth is 320 MHz, that the channel segment subfield is the first value (for example, the value is 0) indicates that the BQR control subfield indicates channel state information of a lower 160 MHz channel; and that the channel segment subfield is the second value (for example, the value is 1) indicates that the BQR control subfield indicates channel state information of a higher 160 MHz channel.

Alternatively, when the BSS operating bandwidth is 320 MHz, that the channel segment subfield is the first value (for example, the value is 0) indicates that the BQR control subfield indicates channel state information of a primary 160 MHz channel; and that the channel segment subfield is the second value (for example, the value is 1) indicates that the BQR control subfield indicates channel state information of a secondary 160 MHz channel.

Alternatively, when the BSS operating bandwidth is 240 MHz, that the channel segment subfield is the first value (for example, the value is 0) indicates that the BQR control subfield indicates channel state information of a lower 160 MHz channel; and that the channel segment subfield is the second value (for example, the value is 1) indicates that the BQR control subfield indicates channel state information of a highest 80 MHz channel.

Alternatively, when the BSS operating bandwidth is 240 MHz, that the channel segment subfield is the first value (for example, the value is 0) indicates that the BQR control subfield indicates channel state information of a lowest 80 MHz channel, and that the channel segment subfield is the second value (for example, the value is 1) indicates that the BQR control subfield indicates channel state information of a higher 160 MHz channel.

Alternatively, when the BSS operating bandwidth is 240 MHz, that the channel segment subfield is the first value (for example, the value is 0) indicates that the BQR control subfield indicates channel state information of a primary 160 MHz channel; and that the channel segment subfield is the second value (for example, the value is 1) indicates that the BQR control subfield indicates channel state information of an 80 MHz channel in the 240 MHz channel other than the primary 160 MHz channel.

Alternatively, when the BSS operating bandwidth is 240 MHz, that the channel segment subfield is the first value (for example, the value is 0) indicates that the BQR control subfield indicates channel state information of a primary 80 MHz channel; and that the channel segment subfield is the second value (for example, the value is 1) indicates that the BQR control subfield indicates channel state information of a 160 MHz channel in the 240 MHz channel other than the primary 80 MHz channel.

It may be understood that the foregoing examples are merely examples for description, and do not constitute a limitation on this embodiment of this application.

The foregoing describes a case in which the first channel segment is indicated by using the second bit. Optionally, the first bitmap is used to indicate that the first channel segment may alternatively be predefined in a protocol. In other words, the second bit may not need to indicate a channel segment for which the BQR control subfield carried in the first control information is used, and the protocol may predefine a channel segment for which the BQR control subfield carried in the first control information is used. This reduces overheads. Optionally, in a predefined manner, the BQR control subfield carried in the first control information may not be limited. For example, the BQR control subfield carried in the first control information may be a channel segment including a primary 20 MHz channel, a channel segment at a relatively low frequency, a channel segment at a relatively high frequency, or the like. Alternatively, it should be noted that when the first control information carries two BQR control subfields, and if a first BQR control subfield and a second BQR control subfield are separately used for a channel segment at a relatively low frequency and a channel segment at a relatively high frequency, the protocol may predefine that one BQR control subfield in control information that carries only one BQR control subfield is used for the channel segment including the primary 20 MHz channel.

For example, when the second device (for example, an AP) requires that a state of a channel with a 320 MHz (or 240 MHz) bandwidth is fed back, or the BSS operating bandwidth (operating bandwidth) is 320 MHz (or 240 MHz), or the first device (for example, a STA) supports a 320 MHz (or 240 MHz) bandwidth, if the A-control subfield carries one BQR control subfield, another 160 MHz (or 80 MHz) channel that is not indicated is unavailable. In this way, when a 160 MHz channel (or 80 MHz channel) is unavailable, the A-control subfield carries one BQR control subfield. This reduces signaling overheads.

Optionally, for a case in which the first control information includes one BQR control subfield, the BQR control subfield includes 2 reserved bits, where one reserved bit may be the second bit used to indicate the first channel segment, and the other may be the first bit used to indicate channel state information of the second channel segment, to save overheads. The following provides description with reference to an example in FIG. 9.

It is assumed that the A-control subfield includes only one BQR control subfield. As shown in FIG. 9, in 10 bits included in the BQR control subfield, the first 8 bits are an available channel bitmap, and are used to indicate busy/available state information of the first channel segment. In addition, the last 2 bits in the 10 bits are originally reserved bits. Herein, in the BQR control subfield, one reserved bit may be used to indicate channel state information of the first channel segment (channel segment), and another reserved bit is used to indicate channel state information of the other channel segment (the second channel segment). Herein, the reserved bit used to indicate the channel state information of the other channel segment is referred to as a status of the other channel segment (Status of the other channel segment) subfield. It may be understood that the status of the other channel segment subfield may alternatively be of another name, which does not affect a function. This is not limited.

For example, that the status of the other channel segment subfield is the first value (for example, the value is 0) indicates that information indicating the other channel segment is not carried. That the status of the other channel segment subfield is the second value (for example, the value is 1) indicates that all 20 MHz subchannels in the other channel segment are in an available state.

Alternatively, that the status of the other channel segment subfield is the first value (for example, the value is 0) indicates that information indicating the other channel segment is not carried. That the status of the other channel segment subfield is the second value (for example, the value is 1) indicates that all 20 MHz subchannels in the other channel segment are in a busy state or an unavailable state.

Alternatively, that the status of the other channel segment subfield is the first value (for example, the value is 0) indicates a reserved state that may be used to indicate a specific state subsequently. That the status of the other channel segment subfield is the second value (for example, the value is 1) indicates that all 20 MHz subchannels in the other channel segment are in an available state.

Alternatively, that the status of the other channel segment subfield is the first value (for example, the value is 0) indicates a reserved state that may be used to indicate a specific state subsequently. That the status of the other channel segment subfield is the second value (for example, the value is 1) indicates that all 20 MHz subchannels in the other channel segment are in a busy state or an unavailable state.

Alternatively, that the status of the other channel segment subfield is the first value (for example, the value is 0) indicates that all 20 MHz subchannels in the other channel segment are in an available state. That the status of the other channel segment subfield is the second value (for example, the value is 1) indicates that all 20 MHz subchannels in the other channel segment are in a busy state or an unavailable state.

It should be noted that the second device interprets the status of the other channel segment subfield only when the A-control subfield carries only one BQR control subfield. If the A-control subfield carries two BQR control subfields, and the BQR control subfields carry the status of the other channel segment subfields, the second device does not need to interpret the status of the other channel segment subfield; or the second device may use the status of the other channel segment subfield as a reserved bit.

The channel segment represented by the status of the other channel segment subfield in FIG. 9 and the channel segment represented by the channel segment subfield have different implementations. For example, the channel segment subfield indicates that 8 bits in the BQR control subfield are used to indicate the channel state of the first subchannel in the first channel segment, and the status of the other channel segment subfield indicates the channel state of the second channel segment. The following provides description with reference to examples in Table 3 and Table 4.

Table 3 shows channel segments that may be respectively represented by the channel segment subfield and the other channel segment subfield when the BSS operating bandwidth is 320 MHz.

TABLE 3

| Channel segment | The other channel segment |
|---|---|
| Lower 160 MHz | Higher 160 MHz |
| Higher 160 MHz | Lower 160 MHz |
| Primary 160 MHz | Secondary 160 MHz |
| Secondary 160 MHz | Primary 160 MHz |

As shown in Table 3, when the channel segment subfield indicates the lower 160 MHz subchannel, the other channel segment subfield indicates the higher 160 MHz subchannel. When the channel segment subfield indicates the higher 160 MHz subchannel, the other channel segment subfield indicates the lower 160 MHz subchannel. When the channel segment subfield indicates the primary 160 MHz subchannel, the other channel segment subfield indicates the secondary 160 MHz subchannel. When the channel segment subfield indicates the secondary 160 MHz subchannel, the other channel segment subfield indicates the primary 160 MHz subchannel.

Table 4 shows channel segments that may be respectively represented by the channel segment subfield and the other channel segment subfield when the BSS operating bandwidth is 240 MHz.

TABLE 4

| Channel segment | The other channel segment |
|---|---|
| Lower 160 MHz | Higher 80 MHz |
| Higher 80 MHz | Lower 160 MHz |
| Lower 80 MHz | Higher 160 MHz |
| Higher 160 MHz | Lower 160 MHz |
| Primary 160 MHz | 80 MHz in the 240 MHz other than the primary 160 MHz |
| 80 MHz in the 240 MHz other than the primary 160 MHz | Primary 160 MHz |
| Primary 80 MHz | 160 MHz in the 240 MHz other than the primary 80 MHz |
| 160 MHz in the 240 MHz other than the primary 80 MHz | Primary 80 MHz |

As shown in Table 4, when the channel segment subfield indicates the lower 160 MHz subchannel, the other channel segment subfield indicates a highest 80 MHz subchannel. When the channel segment subfield indicates a highest 80 MHz subchannel, the other channel segment subfield indicates the lower 160 MHz subchannel. When the channel segment subfield indicates a lowest 80 MHz subchannel, the other channel segment subfield indicates the higher 160 MHz subchannel. When the channel segment subfield indicates the higher 160 MHz subchannel, the other channel segment subfield indicates a lowest 80 MHz subchannel. When the channel segment subfield indicates the primary 160 MHz subchannel, the other channel segment subfield indicates the 80 MHz subchannel in the 240 MHz subchannel other than the primary 160 MHz subchannel. When the channel segment subfield indicates the 80 MHz subchannel in the 240 MHz subchannel other than the primary 160 MHz subchannel, the other channel segment subfield indicates the primary 160 MHz subchannel. When the channel segment subfield indicates the primary 80 MHz subchannel, the other channel segment subfield indicates the 160 MHz subchannel in the 240 MHz subchannel other than the primary 80 MHz subchannel. When the channel segment subfield indicates the 160 MHz subchannel in the 240 MHz subchannel other than the primary 80 MHz subchannel, the other channel segment subfield indicates the primary 80 MHz subchannel.

It may be understood that the foregoing examples in Table 1 to Table 4 are merely examples for ease of understanding, and do not constitute a limitation on this embodiment of this application.

It should be understood that examples in FIG. 4 and in FIG. 6 to FIG. 9 in the embodiments of this application are merely intended to help a person skilled in the art understand the embodiments of this application, instead of limiting the embodiments of this application to specific scenarios in the examples. It is clear that a person skilled in the art may make various equivalent modifications or changes based on the examples in FIG. 4 and FIG. 6 to FIG. 9, and such modifications or changes also fall within the scope of the embodiments of this application.

The current standard supports dynamic bandwidth negotiation by using a request to send (request to send, RTS) frame/clear to send (clear to send, CTS) frame. A specific manner is that a station A sends an RTS frame to a station B, where the RTS frame carries an available channel bandwidth of the station A. After receiving the RTS frame, the station B returns a CTS frame to the station A, where the CTS frame carries information about an available channel of the station B within a range of the available bandwidth of the station A. After receiving the CTS frame, the station A uses a channel indicated by the CTS frame as a transmission opportunity (transmission opportunity, TXOP) bandwidth. The CTS frame can indicate a channel with a maximum bandwidth of 160 MHz.

In addition, when the BSS operating channel bandwidth is greater than 160 MHz, an extremely high throughput request to send (extremely high throughput request to send, EHT-RTS) frame may be introduced to perform dynamic bandwidth negotiation. Alternatively, a multi-user request to send (multi-user request to send, MU-RTS) frame may be modified, so that the MU-RTS frame carries an indication of a bandwidth greater than 160 MHz, to achieve an effect that is the same as that when the EHT-RTS is used. The modified MU-RTS frame may be referred to as an extremely high throughput multi-user request to send (extremely high throughput multi-user request to send, EHT-MU-RTS) frame. The EHT-RTS frame and the EHT-MU-RTS frame have different frame formats and frame types, but functions are the same. In the standard, either the EHT-RTS frame or the EHT-MU-RTS frame is usually selected to perform dynamic bandwidth negotiation.

In the foregoing dynamic bandwidth negotiation processes, to avoid introducing a new frame type, an embodiment of this application further provides a communication method, where a first request to send frame (for example, the RTS frame, the EHT-RTS frame, or the EHT-MU-RTS frame) is replied by reusing the BQR control subfield, to indicate a channel state.

Figure 10:
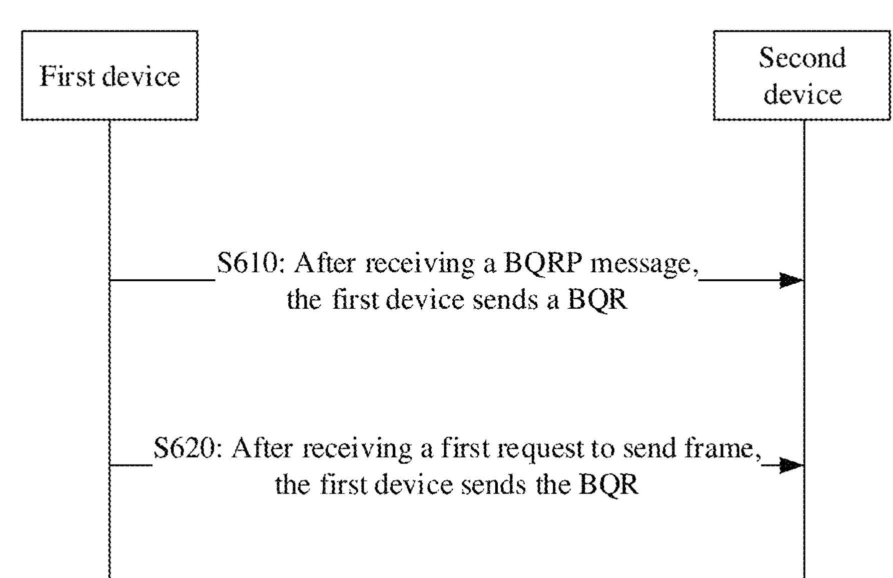
FIG. 10 is a schematic diagram of a communication method according to another embodiment of this application.

FIG. 10 is a schematic diagram of a communication method 600 according to an embodiment of this application. The method 600 shown in FIG. 10 includes the following steps.

S610: After receiving a bandwidth query report poll (bandwidth query report poll, BQRP) message, a first device sends a bandwidth query report BQR to a second device, where the BQR includes channel state information of a basic service set BSS operating channel bandwidth.

The BQRP message is carried in a BQRP trigger frame. The BQRP message is used to request a channel state report of the bandwidth from the first device.

S620: After receiving a first request to send frame, the first device sends the BQR to the second device. The first request to send frame is used to perform dynamic bandwidth negotiation.

For example, the first request to send frame may be an RTS frame, an MU-RTS frame, an EHT-RTS frame, or an EHT-MU-RTS frame.

In this embodiment of this application, a BQR control subfield is reused, so that the BQR may also be replied when the first request to send frame is received, and a new frame type does not need to be introduced. The BQR control subfield has two functions. The BQR control subfield keeps an original function of responding to the BQRP trigger frame, to report the channel state information, and a function of responding to the RTS frame, the MU-RTS frame, the EHT-RTS frame, or the EHT-MU-RTS frame, to perform dynamic bandwidth negotiation.

That the first device sends the BQR to the second device may include: replying to the BQR after a short interframe space (short interframe space, SIFS) time. In other words, after receiving a request frame (for example, the BQRP message or the first request to send frame), the first device immediately responds (immediate response) to the BQR Immediately responding means replying after the SIFS time.

In this embodiment of this application, there are some differences between using the BQR to reply to the BQRP message and using the first request to send frame to reply to the BQRP message. The following describes the differences in detail.

A frame format used by the first device to reply to the BQRP message by using the BQR is different from a frame format used by the first device to reply to the first request to send frame by using the BQR. Optionally, in a case in which the first device sends the BQR after receiving the BQRP message (in other words, after receiving the bandwidth query report poll BQRP message, the first device sends the bandwidth query report BQR to the second device), the BQR is carried in a trigger-based physical layer protocol data unit (trigger-based PHY protocol data unit, TB PPDU); and in a case in which the first device sends the BQR after receiving the first request to send frame (in other words, after receiving the first request to send frame, the first device sends the BQR to the second device), the BQR is carried in a non-high throughput physical layer protocol data unit PPDU or a non-high throughput duplicate physical layer protocol data unit PPDU.

For example, after receiving the BQRP message, the first device replies to the BQR by using the TB PPDU, in other words, the BQR control subfield is carried in the TB PPDU. After receiving the EHT-RTS frame or the EHT-MU-RTS frame, the first device replies to the BQR by using the non-high throughput non-HT PPDU or the non-high throughput non-HT duplicate PPDU, that is, the BQR control subfield is carried in the non-HT PPDU or the non-HT duplicate PPDU.

In a case in which the first device replies to the BQRP message by using the BQR, a busy/available state of a primary 20 MHz channel does not need to be considered. However, in a case in which the first device replies to the first request to send frame by using the BQR, the busy/available state of the primary 20 MHz channel needs to be considered.

Optionally, in the case in which the first device sends the BQR after receiving the BQRP message (in other words, after receiving the bandwidth query report poll BQRP message, the first device sends the bandwidth query report BQR to the second device), before the first device sends the BQR to the second device, the method further includes: The first device determines that a subchannel on which a resource unit (resource unit, RU) is located is in an available state. In other words, as long as all subchannels on which the RU is located are in an available state, the first device may reply to the BQR without considering the busy/available state of the primary 20 MHz channel. The RU is a transmission resource allocated to the BQR by using the BQRP trigger frame.

In the case in which the first device sends the BQR after receiving the first request to send frame (in other words, after receiving the first request to send frame, the first device sends the BQR to the second device), before the first device sends the BQR to the second device, the method further includes: The first device determines that the primary 20 MHz subchannel in the BSS operating channel bandwidth is in an available state. In other words, the first device needs to consider the busy/available state of the primary 20 MHz subchannel in the BSS operation channel bandwidth, and replies to the BQR only when the primary 20 MHz subchannel is in an available state.

In the case in which the BQRP message is replied by using the BQR and in the case in which the BQR is replied by using the first request to send frame, the first device performs channel sensing on different occasions.

Optionally, in the case in which the first device sends the BQR after receiving the BQRP message (in other words, after receiving the bandwidth query report poll BQRP message, the first device sends the bandwidth query report BQR to the second device), the method further includes: The first device senses each channel in the BSS operation channel bandwidth in the short interframe space SIFS time after the first device receives a PPDU carrying the BQRP message. In other words, the first device senses each channel after the SIFS time in which the BQRP message is received.

Optionally, in the case in which the first device sends the BQR after receiving the first request to send frame (in other words, after receiving the first request to send frame, the first device sends the BQR to the second device), the method further includes: The first device senses each channel in the BSS operation channel bandwidth in a point coordination function interframe space (point coordination function interframe space, PIFS) time before the first device receives a PPDU carrying the first request to send frame. In other words, the first device senses each channel in the PIFS time before the first device receives the first request to send frame.

For example, after receiving the BQRP trigger frame, the first device performs energy detection (energy detection, ED) or carrier sensing (carrier sensing) in the SIFS time after the first device receives the PPDU carrying the BQRP trigger frame. Then, the first device feeds back the obtained busy/available state of the channel by using the BQR control subfield. The BQR control subfield is transmitted on the RU allocated by using the BQRP trigger frame. Herein, as long as all 20 MHz subchannels on which the RU used to transmit the BQR control subfield is located are in an available state, the first device may reply to the BQR without considering the busy/available state of the primary 20 MHz channel.

For example, after receiving the EHT-RTS frame or the EHT-MU-RTS frame, the first device performs CCA in the PIFS time before the first device receives the PPDU carrying the EHT-RTS frame or the EHT-MU-RTS frame, and then replies to the BQR control subfield based on a CCA result.

The CCA includes both packet detection (packet detection, PD) and energy detection ED. If the primary 20 MHz subchannel is in a busy state, the BQR control subfield is not replied. If the primary 20 MHz subchannel is in an available state, the first device replies to the BQR control subfield.

The foregoing provides description by using an example in which the first request to send frame is an EHT-RTS frame or an EHT-MU-RTS frame. It may be understood that BQR control subfield may also be used to reply to an RTS frame or an MU-RTS frame. Specific usage is the same as a method in which the first device responds to the EHT-RTS frame or the EHT-MU-RTS frame. In other words, this embodiment of this application is also applicable to a scenario in which a bandwidth is less than or equal to 160 MHz. In this way, the first device does not need to reply to different types of response frames based on different bandwidths, that is, the first device may reply to the BQR control subfield when bandwidths are different.

Optionally, when replying to the BQR, the first device may further consider a value of a first network allocation vector (network allocation vector, NAV), and reply to the BQR when the value of the first NAV is 0. If there is only one NAV, the value of the first NAV is a value of the NAV. If there are two NAVs, namely, a basic NAV and an intra-BSS NAV, the value of the first NAV is a value of the basic NAV.

For ease of understanding, the NAV is briefly described here. A NAV mechanism is a virtual carrier sensing mechanism in the Wi-Fi™ standard. Each transmitted frame (other than a few frames such as a PS-Poll frame and an NDP frame) carries a duration field. When receiving a frame and finding that a target receiving station of the frame is not the first device, the first device (for example, a station) sets a value of the duration field to the value of the NAV of the first device. When the value of the NAV is not 0, the first device may not perform active competition, to avoid affecting a station that is performing transmission. When the associated second device (for example, an AP) performs uplink scheduling by using a trigger frame, if the first device finds that a station that sets the NAV for the first device is the second device, the first device may reply. If the first device finds that the station that sets the NAV for the first device is not the second device, the first device is not allowed to reply. Before the IEEE 11ax standard, there is only one NAV. In the IEEE 11ax standard, two NAVs are introduced, namely, the basic (basic) NAV and the intra-BSS (intra-BSS) NAV. When either the value of the basic NAV or a value of the intra-BSS NAV is not 0, the first device is not allowed to perform active competition, to avoid affecting the station that is performing transmission. When the associated AP performs uplink scheduling by using the trigger frame, if the value of the basic NAV is not 0, the first device is not allowed to reply. Otherwise, if the value of the basic NAV is 0, the first device is allowed to reply (the first device is allowed to reply whether the value of the intra-BSS NAV is 0 or not).

In other words, regardless of that the first device replies to the BQR control subfield after receiving the BQRP message or the first request to send frame, the first device needs to check a state of the NAV before replying to the BQR control subfield. Specifically, when there is one NAV, if the value of the NAV is not 0, the BQR control subfield may not be replied. The BQR control subfield may be replied only when the value of the NAV is 0. When there are two NAVs, namely, the basic NAV and the intra-BSS NAV, if the value of the basic NAV is not 0, the BQR control subfield may not be replied. The BQR control subfield may be replied only when the value of the basic NAV is 0.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in the embodiments of this application may also correspondingly implement these features or functions. Details are not described herein.

It may further be understood that the solutions in the embodiments of this application may be appropriately combined for usage, and explanations or description of terms in the embodiments may be mutually referenced or explained in the embodiments. This is not limited.

It may further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of the embodiments of this application.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware. It may be understood that the technical features described in the method embodiments are also applicable to the following apparatus embodiments.

Figure 11:
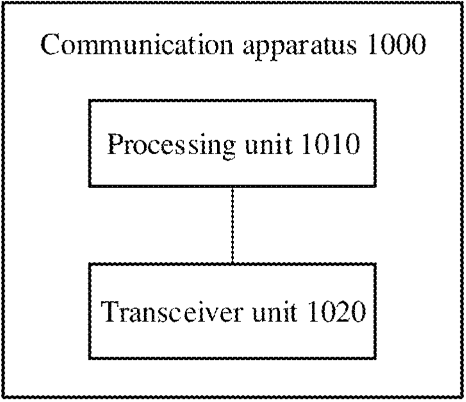
FIG. 11 is a schematic block diagram of a communication apparatus according to an embodiment of this application.

FIG. 11 is a schematic block diagram of a communication apparatus 1000 according to an embodiment of this application. As shown in FIG. 11, the communication apparatus includes a processing unit 1010 and a transceiver unit 1020.

In a possible design, the communication apparatus 1000 may correspond to the first device in the foregoing method embodiment. For example, the communication apparatus 1000 may be a STA or a chip disposed in a STA. For another example, the communication apparatus 1000 may be an AP or a chip disposed in an AP.

In an embodiment, the processing unit 1010 is configured to generate first control information, where the first control information includes a first field and a second field, the first field is used to indicate a channel state of a first subchannel in a first channel segment; and the second field is used to indicate a channel state of a second subchannel in a second channel segment. The transceiver unit 1020 is configured to send the first control information to a second device.

Optionally, that the first field is used to indicate a channel state of a first subchannel in a first channel segment includes: A first bitmap in the first field is used to indicate a channel state of each first subchannel in the first channel segment; and that the second field is used to indicate a channel state of a second subchannel in a second channel segment includes: A second bitmap in the second field is used to indicate a channel state of each second subchannel in the second channel segment.

Alternatively, in an embodiment, the processing unit 1010 is configured to generate first control information, where a first bitmap in the first control information is used to indicate a channel state of a first subchannel in a first channel segment; and a first bit in the first control information is used to indicate a channel state of a second channel segment. The transceiver unit 1020 is configured to send the first control information to a second device.

Optionally, a second bit in the first control information is used to indicate the first channel segment.

Optionally, that a first bit is used to indicate a channel state of a second channel segment includes: A value of the first bit is a first value, and the first value indicates that a channel state of a subchannel in the second channel segment is available; or a value of the first bit is a second value, and the second value indicates that a channel state of a subchannel in the second channel segment is busy or unavailable.

Optionally, the first bitmap is used to indicate that the first channel segment is predefined by a protocol.

Alternatively, in an embodiment, the processing unit 1010 is configured to: after receiving a bandwidth query report poll BQRP message, invoke the transceiver unit 1020 to send a bandwidth query report BQR to a second device, where the BQR includes channel state information of a basic service set BSS operating channel bandwidth; and after receiving a first request to send frame, invoke the transceiver unit 1020 to send the BQR to the second device.

Optionally, that the transceiver unit 1020 is configured to send the BQR to the second device includes: sending the BQR to the second device after a short interframe space SIFS time.

Optionally, after receiving the bandwidth query report poll BQRP message, the processing unit 1010 invokes the transceiver unit 1020 to send the bandwidth query report BQR to the second device, and the BQR is carried in a trigger-based physical layer protocol data unit TB PPDU; and after receiving the first request to send frame, the processing unit 1010 invokes the transceiver unit 1020 to send the BQR to the second device, and the BQR is carried in a non-high throughput physical layer protocol data unit PPDU or a non-high throughput duplicate physical layer protocol data unit PPDU.

Optionally, after receiving the bandwidth query report poll BQRP message, and before invoking the transceiver unit 1020 to send the bandwidth query report BQR to the second device, the processing unit 1010 is further configured to determine that a subchannel on which a resource unit RU is located is in an available state; and after receiving the first request to send frame, and before invoking the transceiver unit 1020 to send the BQR to the second device, the processing unit 1010 is further configured to determine that a primary subchannel in the BSS operating channel bandwidth is in an available state.

Optionally, after receiving the bandwidth query report poll BQRP message, and invoking the transceiver unit 1020 to send the bandwidth query report BQR to the second device, the processing unit 1010 is further configured to sense each channel in the BSS operation channel bandwidth in the short interframe space SIFS time after the processing unit 1010 receives a PPDU carrying the BQRP message; and after receiving the first request to send frame, and invoking the transceiver unit 1020 to send the BQR to the second device, the processing unit 1010 is further configured to sense each channel in the BSS operation channel bandwidth in a point coordination function interframe space PIFS time before the processing unit 1010 receives a PPDU carrying the first request to send frame.

Optionally, the processing unit 1010 is further configured to determine that a value of a first network allocation vector NAV is 0.

Specifically, the communication apparatus 1000 may correspond to the first device in the method 300, the method 500, or the method 600 in the embodiments of this application. The communication apparatus 1000 may include a unit configured to perform the method performed by the first device in the method 300 in FIG. 3, the method 500 in FIG. 5, or the method 600 in FIG. 10. In addition, units in the communication apparatus 1000 and the foregoing other operations or functions are separately used to implement corresponding procedures of the first device in the method 300 in FIG. 3, the method 500 in FIG. 5, or the method 600 in FIG. 10.

It should be further understood that when the communication apparatus 1000 is a chip disposed in the first device, the transceiver unit 1020 in the communication apparatus 1000 may be a transceiver circuit.

In a possible design, the communication apparatus 1000 may correspond to the second device in the foregoing method embodiment. For example, the communication apparatus 1000 may be an AP or a chip disposed in an AP. For another example, the communication apparatus 1000 may be a STA or a chip disposed in a STA.

In an embodiment, the transceiver unit 1020 is configured to receive first control information from a first device, where the first control information includes a first field and a second field, the first field is used to indicate a channel state of a first subchannel in a first channel segment, and the second field is used to indicate a channel state of a second subchannel in a second channel segment; and the processing unit 1010 is configured to determine channel state information of each channel based on the first control information.

Alternatively, in an embodiment, the transceiver unit 1020 is configured to receive first control information from a first device, where a first bitmap in the first control information is used to indicate a channel state of a first subchannel in a first channel segment, and a first bit in the first control information is used to indicate a channel state of a second channel segment; and the processing unit 1010 is configured to determine channel state information of each channel based on the first control information.

Optionally, a second bit in the first control information is used to indicate the first channel segment.

Optionally, that a first bit is used to indicate a channel state of a second channel segment includes: A value of the first bit is a first value, and the first value indicates that a channel state of a subchannel in the second channel segment is available; or a value of the first bit is a second value, and the second value indicates that a channel state of a subchannel in the second channel segment is busy or unavailable.

Optionally, the first bitmap is used to indicate that the first channel segment is predefined by a protocol.

Alternatively, in an embodiment, the processing unit 1010 is configured to: after sending a bandwidth query report poll (bandwidth query report poll, BQRP) message, invoke the transceiver unit 1020 to receive a BQR; and after sending a first request to send frame, invoke the transceiver unit 1020 to receive the BQR.

Specifically, the communication apparatus 1000 may correspond to the second device in the method 300, the method 500, or the method 600 in the embodiments of this application. The communication apparatus 1000 may include a unit configured to perform the method performed by the second device in the method 300 in FIG. 3, the method 500 in FIG. 5, or the method 600 in FIG. 10. In addition, units in the communication apparatus 1000 and the foregoing other operations or functions are separately used to implement corresponding procedures of the second device in the method 300 in FIG. 3, the method 500 in FIG. 5, or the method 600 in FIG. 10.

It should be further understood that when the communication apparatus 1000 is a chip disposed in the second device, the transceiver unit 1020 in the communication apparatus 1000 may be a transceiver circuit.

Division into modules in the embodiments of this application is an example, is merely logical function division, and may be another division manner in an actual implementation. In addition, function modules in the embodiments of this application may be integrated into one processor, or may exist alone physically, or two or more modules are integrated into one module. The integrated module may be implemented in a form of hardware, or may be implemented in a form of a software functional module.

The foregoing describes the communication apparatus in this embodiment of this application with reference to FIG. 11. The following describes a possible product form of the communication apparatus. It should be understood that any form of product that has a function of the foregoing communication apparatus falls within the protection scope of the embodiments of this application. It should be further understood that the following description is merely an example, and does not limit a product form of the communication apparatus in the embodiments of this application.

As a possible product form, the communication apparatus described in this embodiment of this application may be implemented by using a general bus architecture. The following provides description with reference to FIG. 12.

Figure 12:
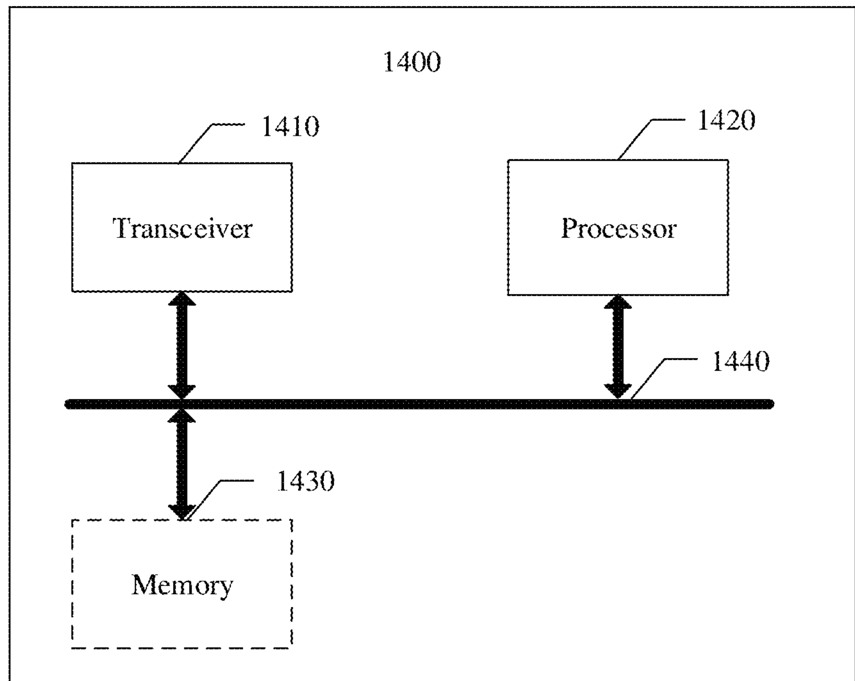
FIG. 12 is a schematic diagram of a structure of a communication apparatus according to an embodiment of this application.

FIG. 12 is a schematic diagram of a structure of a communication apparatus 1400 according to an embodiment of this application. The apparatus 1400 includes a transceiver 1410 and at least one processor 1420, and is configured to implement the communication method provided in the embodiments of this application. The transceiver 1410 is configured to communicate with another device through a transmission medium, so that an apparatus in the apparatus 1400 is configured to communicate with the another device.

In a possible implementation, the communication apparatus 1400 may be a first device, or may be an apparatus that can match a first device. For example, the communication apparatus 1400 may be installed in the first device. The communication apparatus 1400 may be a chip system. In this embodiment of this application, the chip system may include a chip, or may include a chip and another discrete component.

For example, the processor 1420 may generate first control information, where the first control information includes a first field and a second field, the first field is used to indicate a channel state of a first subchannel in a first channel segment, and the second field is used to indicate a channel state of a second subchannel in a second channel segment. The transceiver 1410 is configured to send the first control information to a second device.

For example, the processor 1420 may generate first control information, where a first bitmap in the first control information is used to indicate a channel state of a first subchannel in a first channel segment, and a first bit in the first control information is used to indicate a channel state of a second channel segment. The transceiver 1410 is configured to send the first control information to a second device.

For example, after receiving a bandwidth query report poll BQRP message, the processor 1420 may send a bandwidth query report BQR to a second device by using the transceiver 1410, where the BQR includes channel state information of a basic service set BSS operating channel bandwidth; and after receiving a first request to send frame, the processor 1420 may send the BQR to the second device by using the transceiver 1410.

In another possible implementation, the communication apparatus 1400 may be a second device, or may be a communication apparatus that can match a second device. For example, the communication apparatus 1400 may be installed in the second device. The apparatus may be a chip system. In this embodiment of this application, the chip system may include a chip, or may include a chip and another discrete component.

For example, the processor 1420 may receive first control information from a first device by using the transceiver 1410, where the first control information includes a first field and a second field, the first field is used to indicate a channel state of a first subchannel in a first channel segment, and the second field is used to indicate a channel state of a second subchannel in a second channel segment.

For example, the processor 1420 may receive first control information from a first device by using the transceiver 1410, where a first bitmap in the first control information is used to indicate a channel state of a first subchannel in a first channel segment, and a first bit in the first control information is used to indicate a channel state of a second channel segment.

For example, the processor 1420 may receive a BQR from a first device by using the transceiver 1410.

Optionally, the apparatus 1400 may further include at least one memory 1430, configured to store program instructions and/or data. The memory 1430 is coupled to the processor 1420. Couplings in this embodiment of this application are indirect couplings or communication connections between apparatuses, units, or modules, may be electrical, mechanical, or another form, and are used for information interaction between the apparatuses, the units, and the modules. The processor 1420 may cooperate with the memory 1430. The processor 1420 may execute the program instructions stored in the memory 1430. At least one of the at least one memory may be included in the processor.

In this embodiment of this application, the transceiver 1410 may be a communication interface, an interface, a bus, a circuit, a pin, or an apparatus that can implement a transceiver function.

A specific connection medium between the transceiver 1410, the processor 1420, and the memory 1430 is not limited in this embodiment of this application. In this embodiment of this application, the memory 1430, the processor 1420, and the transceiver 1410 are connected through a bus 1440 in FIG. 12, and the bus is represented by a thick line in FIG. 12. A connection manner between other components is schematically described, and is not limited thereto. The bus may be classified into an address bus, a data bus, a control bus, or the like. For ease of representation, only one thick line is used to represent the bus in FIG. 12, but this does not mean that there is only one bus or only one type of bus.

It should further be understood that when the communication apparatus 1000 in FIG. 11 is the communication apparatus in FIG. 12, the transceiver unit 1020 in the communication apparatus 1000 may correspond to the transceiver 1410 shown in FIG. 12, and the processing unit 1010 in the communication apparatus 1000 may correspond to the processor shown in FIG. 12.

Optionally, the communication apparatus 1000 in FIG. 11 further includes a storage unit (not shown in FIG. 11). The storage unit may be configured to store instructions or data. The processing unit may invoke the instructions or data stored in the storage unit, to implement a corresponding operation. The storage unit may be implemented by using at least one memory. For example, the storage unit may correspond to the memory in FIG. 12.

It should be understood that the communication apparatus shown in FIG. 12 can implement the communication method in the embodiments of this application (for example, the method performed by the first device or the method performed by the second device in the method embodiment shown in FIG. 3, FIG. 5, or FIG. 10). Operations and/or functions of modules in the communication apparatus are separately used to implement corresponding procedures in the foregoing method embodiments. For details, refer to the description in the foregoing method embodiments. To avoid repetition, detailed description is properly omitted herein.

It should be understood that the communication apparatus shown in FIG. 12 is merely a possible architecture, and should not constitute any limitation on this application.

As a possible product form, the communication apparatus described in this embodiment of this application may be implemented by using a general-purpose processor.

The general-purpose processor for implementing the communication method in the embodiments of this application includes a processing circuit and a transceiver circuit that communicates with the processing circuit through an internal connection. The processing circuit is configured to generate the first control information. For description of generating the first control information, refer to all technical details in the foregoing method embodiments. The transceiver circuit is configured to send and receive the first control information. Optionally, the general-purpose processor may further include a storage medium. The storage medium is configured to store instructions executed by the processing circuit.

Alternatively, as a possible product form, the communication apparatus described in this embodiment of this application may further be implemented by using the following components: one or more FPGAs (field programmable gate arrays), a PLD (programmable logic device), a controller, a state machine, gate logic, a discrete hardware component, any other suitable circuit, or any combination of circuits that can perform various functions described in this application.

Optionally, the communication apparatus in this embodiment of this application includes but is not limited to an AP device, for example, a communication server, a router, a switch, or a bridge; and a non-AP device, for example, a mobile phone, a tablet computer, a laptop computer, a smart watch, or a smart TV.

According to the method provided by the embodiments of this application, this application further provides a computer program product. The computer program product includes computer program code. When the computer program code is run on a computer, the computer is enabled to perform the method in the embodiment shown in FIG. 3, FIG. 5, or FIG. 10.

According to the method provided by the embodiments of this application, this application further provides a computer-readable storage medium. The computer-readable medium stores program code. When the program code is run on a computer, the computer is enabled to perform the method in the embodiment shown in FIG. 3, FIG. 5, or FIG. 10.

An embodiment of this application further provides a processing apparatus including a processor and an interface. The processor is configured to perform the communication method in any one of the foregoing method embodiments.

A person skilled in the art may further understand that various illustrative logical blocks (illustrative logic block) and steps (step) that are listed in the embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the protection scope of the embodiments of this application.

It should be understood that the processor in this embodiment of this application may be an integrated circuit chip, and has a signal processing capability. In an implementation process, the steps in the foregoing method embodiments may be implemented by using a hardware integrated logic circuit in the processor, or by using an instruction in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, a system on chip (system on chip, SoC), a central processing unit (central processing unit, CPU), a network processor (network processor, NP), a digital signal processing (digital signal processor, DSP), a microcontroller (microcontroller unit, MCU), a programmable controller (programmable logic device, PLD), or another integrated chip. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the systems and method described in this specification include but are not limited to these memories and any memory of another suitable type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state disk (solid-state disk, SSD)), or the like.

It should be understood that an "embodiment" in the entire specification means that particular characteristics, structures, or features related to the embodiment are included in at least one embodiment of this application. Therefore, the embodiments in the entire specification do not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should further be understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that first, second, and various reference numerals in this application are merely distinguished for convenient description, and are not used to limit a scope of the embodiments of this application, and also indicate a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" in this specification may be often used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" usually indicates an "or" relationship between the associated objects.

The term "at least one of . . . " in this specification indicates all or any combination of listed items. For example, "at least one of A, B, and C" may indicate the following six cases: A exists alone, B exists alone, C exists alone, A and B coexist, B and C coexist, and A, B, and C coexist. A may be singular or plural, B may be singular or plural, and C may be singular or plural.

It should be understood that in the embodiments of this application, "B corresponding to A" represents that B is associated with A, and B may be determined based on A. However, it should be further understood that determining B based on A does not mean that B is determined based on only A. B may alternatively be determined based on A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use a different method to implement the described function for each particular application, but it should not be considered that the implementation goes beyond the scope of this application.

It may be clearly understood by a person skilled in the art that, for the purpose of convenient and brief description, for a detailed working process of the system, apparatus, and unit described above, refer to a corresponding process in the foregoing method embodiments, and details are not described herein again.

In the several embodiments provided in this application, it should be understood that the disclosed system, apparatus, and method may be implemented in another manner. For example, the apparatus embodiment described above is merely an example. For example, division into units is merely logical function division and may be another division manner in actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may have an electrical form, a mechanical form, or another form.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

generating, by a first device, first control information, wherein the first control information comprises a first field and a second field, the first field is useable to indicate a channel state of a first subchannel in a first channel segment, and the second field is useable to indicate a channel state of a second subchannel in a second channel segment; and sending, by the first device, the first control information to a second device, wherein the first control information is an A-control subfield, the first channel segment is a primary 160 MHZ, and the second channel segment is a secondary 160 MHZ;

wherein the primary 160 MHZ channel is a 160 MHz channel in which a primary 20 MHz is located, the secondary 160 MHZ is a 160 MHz subchannel in a 320 MHz subchannel other than the primary 160 MHz subchannel.

2. The method according to claim 1, wherein the first field includes a first bitmap useable to indicate a channel state of each first subchannel in the first channel segment; and the second field includes a second bitmap useable to indicate a channel state of each second subchannel in the second channel segment.

3. The method according to claim 1, wherein the first field and the second field are bandwidth query report (BQR) control subfields.

4. The method according to claim 1, wherein a first bandwidth of the first channel segment is 160 megahertz (MHz), and a second bandwidth of the second channel segment is 160 MHZ.

5. The method according to claim 1, wherein the channel state of the first subchannel in the first channel segment or the channel state of the second subchannel in the second channel segment includes an available state or a busy state.

6. A communication apparatus, comprising:

a non-transitory memory, configured to store non-transitory instructions; and at least one processor coupled to the processor, the at least one processor being configured to execute the non-transitory instructions, to thereby cause the communication apparatus to perform operations comprising:

generating first control information, wherein the first control information comprises a first field and a second field, the first field is useable to indicate a channel state of a first subchannel in a first channel segment, and the second field is useable to indicate a channel state of a second subchannel in a second channel segment; and sending the first control information to a second device, wherein the first control information is an A-control subfield, the first channel segment is a primary 160 MHZ, and the second channel segment is a secondary 160 MHZ;

wherein the primary 160 MHZ channel is a 160 MHz channel in which a primary 20 MHz is located, the secondary 160 MHZ is a 160 MHz subchannel in a 320 MHz subchannel other than the primary 160 MHz subchannel.

7. The communication apparatus according to claim 6, wherein the first field includes a first bitmap useable to indicate a channel state of each first subchannel in the first channel segment; and the second field includes a second bitmap useable to indicate a channel state of each second subchannel in the second channel segment.

8. The communication apparatus according to claim 6, wherein the first field and the second field are bandwidth query report (BQR) control subfields.

9. The communication apparatus according to claim 6, wherein a first bandwidth of the first channel segment is 160 megahertz (MHz), and a second bandwidth of the second channel segment is 160 MHZ.

10. The communication apparatus according to claim 6, wherein the channel state of the first subchannel in the first channel segment or the channel state of the second subchannel in the second channel segment includes an available state or a busy state.

11. A non-transitory computer-readable storage medium, wherein the non-transitory computer-readable storage medium is configured to store non-transitory instructions, and in response to the non-transitory instructions being executed by a processor, the processor is configured to perform operations including:

generating first control information, wherein the first control information comprises a first field and a second field, the first field is useable to indicate a channel state of a first subchannel in a first channel segment, and the second field is useable to indicate a channel state of a second subchannel in a second channel segment; and sending the first control information to a second device, wherein the first control information is an A-control subfield, the first channel segment is a primary 160 MHZ, and the second channel segment is a secondary 160 MHZ;

wherein the primary 160 MHZ channel is a 160 MHz channel in which a primary 20 MHz is located, the secondary 160 MHZ is a 160 MHz subchannel in a 320 MHz subchannel other than the primary 160 MHz subchannel.

12. The non-transitory computer-readable storage medium according to claim 11, wherein the first field includes a first bitmap useable to indicate a channel state of each first subchannel in the first channel segment; and the second field includes a second bitmap useable to indicate a channel state of each second subchannel in the second channel segment.

13. The non-transitory computer-readable storage medium according to claim 11, wherein the first field and the second field are bandwidth query report (BQR) control subfields.

14. The non-transitory computer-readable storage medium according to claim 11, wherein a first bandwidth of the first channel segment is 160 megahertz (MHz), and a second bandwidth of the second channel segment is 160 MHZ.

15. The non-transitory computer-readable storage medium according to claim 11, wherein the channel state of the first subchannel in the first channel segment or the channel state of the second subchannel in the second channel segment includes an available state or a busy state.

* * * * *